United States Patent
Liang (10) Patent No.: US 11,616,969 B2
(45) Date of Patent: Mar. 28, 2023

(54) TARGET IDENTIFICATION SYSTEM AND METHOD THEREOF

(71) Applicant: Robert Bosch GmbH, Stuttgart (DE)

(72) Inventor: Jinyao Liang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/953,698

(22) Filed: Nov. 20, 2020

(65) Prior Publication Data

US 2021/0160526 A1 May 27, 2021

(30) Foreign Application Priority Data

Nov. 22, 2019 (CN) .......................... 201911153773.2

(51) Int. Cl.
*H04N 19/513* (2014.01)
*H04N 19/573* (2014.01)
*H04N 19/58* (2014.01)
*G06K 9/62* (2022.01)
*G06V 20/40* (2022.01)

(52) U.S. Cl.
CPC ......... *H04N 19/513* (2014.11); *G06K 9/6215* (2013.01); *G06V 20/46* (2022.01); *H04N 19/573* (2014.11); *H04N 19/58* (2014.11); *G06V 2201/07* (2022.01)

(58) Field of Classification Search
None
See application file for complete search history.

(56) References Cited

U.S. PATENT DOCUMENTS

| | | | |
|---|---|---|---|
| 2018/0336700 A1* | 11/2018 | Gao | .......................... G06T 7/74 |
| 2019/0339082 A1* | 11/2019 | Doig | ....................... G01C 21/32 |
| 2020/0126239 A1* | 4/2020 | Qian | .......................... G06T 7/20 |

FOREIGN PATENT DOCUMENTS

CN 108510734 A 9/2018

* cited by examiner

*Primary Examiner* — Samuel D Fereja
(74) *Attorney, Agent, or Firm* — Maginot, Moore & Beck LLP (57) ABSTRACT

A target identification method includes receiving target detection information for a current target from a device, and acquiring target state information of multiple reference targets. A degree of matching between the target detection information and the target state information of each of the multiple reference targets is determined; and the current target is associated with a corresponding reference target having a best degree of matching amongst the multiple reference targets.

20 Claims, 5 Drawing Sheets

TARGET IDENTIFICATION SYSTEM AND METHOD THEREOF

This application claims priority under 35 U.S.C. § 119 to patent application no. CN 2019 1115 3773.2, filed on Nov. 22, 2019 in China, the disclosure of which is incorporated herein by reference in its entirety.

The disclosure relates to movement detection technology, in particular to identification of a moving target on a driving road using movement information.

BACKGROUND

As network communication technology advances and intelligent vehicles, intelligent cities and roads are constructed, moving targets travelling on a road can be interconnected with other infrastructure ever more conveniently, in order to acquire information about traffic, etc. more effectively; at the same time, the infrastructure can also monitor road traffic states and moving targets, in order to perform traffic management and service more effectively. Such moving targets may be travelling motor vehicles or pedestrians, e.g. cars or electric motorcycles, etc. These motor vehicles such as cars are generally equipped with GPS, a gyroscope, a speedometer and other sensors, which are used to detect the motor vehicle's own travelling state, e.g. speed and direction, etc., and send this to the outside via an onboard wireless network, e.g. report the motor vehicle's own state information to external infrastructure. However, due to positioning precision and other reasons, there is a possibility of error between the movement state of the moving target that is actually perceived and the true movement state thereof. Thus, there is a desire to propose an improved solution to improve the capacity for accurate perception of moving targets.

SUMMARY

In order to acquire the state of moving targets on a driving road more effectively, the disclosure proposes a solution for making comprehensive use of target-related information of different information channels to strengthen moving target perception capability; these different information channels may be the moving targets themselves, but may also be provided indirectly or by detection by other external devices. To this end, according to one aspect of the disclosure, a method is proposed for associatively identifying moving targets from different information sources, the method being executable by a first device and comprising: acquiring target detection information of a current target from a second device; acquiring target state information of each of multiple reference targets; determining a degree of matching between the target detection information and the target state information of each of the multiple reference targets; associating the current target with a matching reference target having the best degree of matching amongst the multiple reference targets. The solution of the disclosure is especially suitable for identifying the same moving target to which information of different information sources relates and performing association; information relevance can thereby be used to identify the target. Furthermore, on the basis of having established an association, the target detection information that relates to a current moving target and is acquired from the second device and the acquired target state information may be used to perform mutual compensation and revision or comprehensively generate target state information of the current target, so as to realize more accurate perception of a current reference moving target or matching target. In addition, in one embodiment, the target state information is autonomously issued by each of the multiple reference targets, but may also be issued by each reference target in response to an instruction of the first device.

According to another aspect of the disclosure, a target identification system is provided, comprising a first device and a second device, wherein: the second device is configured to acquire target detection information of a current target; the first device comprises: a transceiver, configured to acquire target state information of each of multiple reference targets; a central control device, configured to determine a degree of matching between the target detection information and the target state information of each of the multiple reference targets, and associate the current target with a matching reference target having the best degree of matching amongst the multiple reference targets.

In a preferred embodiment, if it is possible to know a target identifier of a reference target, e.g. the target identifier is included in state information from the reference target or obtained by other means, then using the method of the disclosure it is possible to determine, based on an acquired state relating to the current target, whether to send a notification signal to the matching reference target having the target identifier. For example, when it is detected that a current moving target is travelling too fast, an alert signal can be sent thereto because the specific target that the current moving target has already been identified.

In another embodiment, if it is not possible to acquire a target identifier of a reference target, e.g. state information received from the reference target does not contain a target identifier, it is still possible to communicate with the reference target in a relatively accurate and economical manner in the disclosure. For example, when a signal is received from a sensor indicating a state of a current target, e.g. speeding, then based on forward movement direction information contained in the state of the matching reference target, a beam signal corresponding to the forward movement direction can be generated, e.g. using beamforming technology, and the beam signal is then transmitted to the matching reference target that is in the forward movement direction; for example, a broadcast signal on a broadcast channel may use the beamforming technology, and the objective of only transmitting the signal to the moving target with the relevant direction can thereby be achieved.

DETAILED DESCRIPTION

The disclosure is expounded below with reference to demonstrative embodiments, but various changes and modifications falling within the spirit and scope of protection of the disclosure will be obvious to those skilled in the art; thus, the disclosure is not limited to the particular embodiments and specific examples that are set out here by way of example.

At present, the development of information technology has enabled multi-dimensional perception of the same scenario or the same target in the same scenario. These items of perception information may be from active notification by targets, but may also be passively captured information for these targets, e.g. using environmental sensors to detect targets, and may also be reports from other information sources. Accurate perception of a target of interest can be realized by comprehensive processing of these items of information from different source channels. Objectively speaking, multiple targets might be present in the same scenario, thus there is a need to identify different targets or the target of interest.

Figure 1:
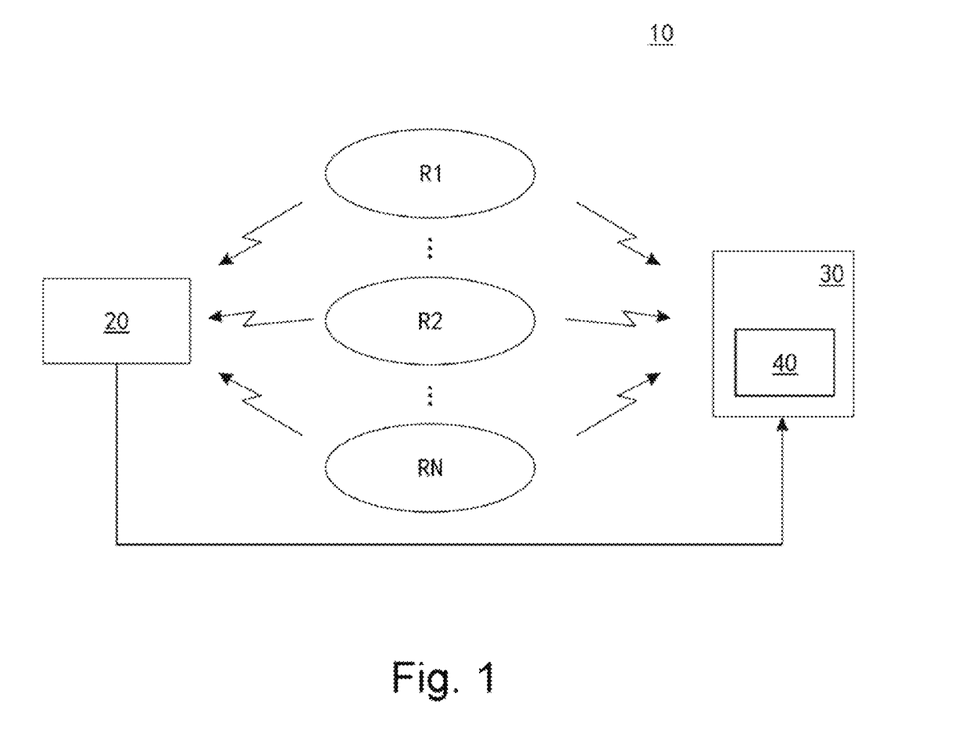
FIG. 1 shows a schematic diagram of a target identification system according to an embodiment of the disclosure.

FIG. 1 shows a target identification system 10 according to an embodiment of the disclosure. As shown in the figure, the target identification system 10 comprises a first device 30 and a second device 20; multiple reference targets R1-RN are also shown illustratively in the figure. The first device 30 may acquire target state information relating to these reference targets R1-RN; in one embodiment, these reference targets may for example actively send their own target state information to the first device 30 directly via a wireless link, e.g. these reference targets may use their own wireless transceivers or other RF interfaces to send information to the outside; and the first device 30 may use a wireless receiver or transceiver (not shown in the figure) to receive from the multiple reference targets R1-RN their own target state information that they have sent. The second device 20 may for example be a sensor, for detecting any one of the reference targets R1-RN that might be within a detection range, to obtain target detection information. The target detection information may be state information of the target, e.g. movement states such as speed and acceleration, but may also be image information of the reference target, e.g. a stationary image or dynamic video, etc. thereof. According to this example, the first device 30 communicates with the second device 20 in a wired or wireless manner, and receives target detection information for a current target (labelled Rc) in a detection range from the second device 20. The second device 20 generally lacks the ability to identify the current target; thus, after receiving the target detection information from the second device 20 and the target state information of the N reference targets, a central control device 40 in the first device 30 matches the target detection information to the received target state information of each of the multiple reference targets, i.e. determines a degree of matching between the target detection information and the target state information of each reference target, i.e. finds a matching reference target from amongst the multiple reference targets that has the highest degree of matching to the current target Rc, and thereby associates the target Rc currently detected by the second device 20 with the matching target amongst the multiple reference targets acquired by the first device 30. In this way, information of different information sources of the reference targets may be used to realize comprehensive perception of the matching reference target, and vice versa. For example, when the first device 30 determines that the target detection information from the second device 20 is best matched to the received state information of the reference target R2, the target detection information of the second device 20 that is received on this occasion is associated with the matching target R2, for the purpose of subsequent processing.

It must be pointed out here that although, in the example above, the first device 30 directly receives the reference targets' own state information that has been actively sent by the multiple reference targets R1-RN, and the second device 20 may detect the multiple reference targets R1-RN to acquire the target detection information, the disclosure is not limited to these information acquisition channels. For example, the first device 30 may also receive state information of the multiple reference targets R1-RN from a third party device, and the first device 30 may even be an onboard unit (OBU) with information processing capability that is installed in the reference target itself; in this case, the onboard unit may directly use a sensor configured on the reference target to detect or compute state information, or the onboard unit may receive state information relating to the vehicle in which it is installed from a third party device. In addition, the second device 20 need not be a sensor, but instead may be another device or entity capable of providing a current state relating to the current target Rc, e.g. infrastructure set up on a traffic road, etc. In addition, in the disclosure, the term "device" is not limited to one or more separate physical entities, but may also refer to a cloud device in a broad sense. In the explanation below, to facilitate description, the case where the first device 30 directly receives the reference targets' own state information that has been actively sent by the multiple reference targets R1-RN, and the second device 20 is realized by a sensor such as a camera, is taken as an example for illustration.

Figure 2:
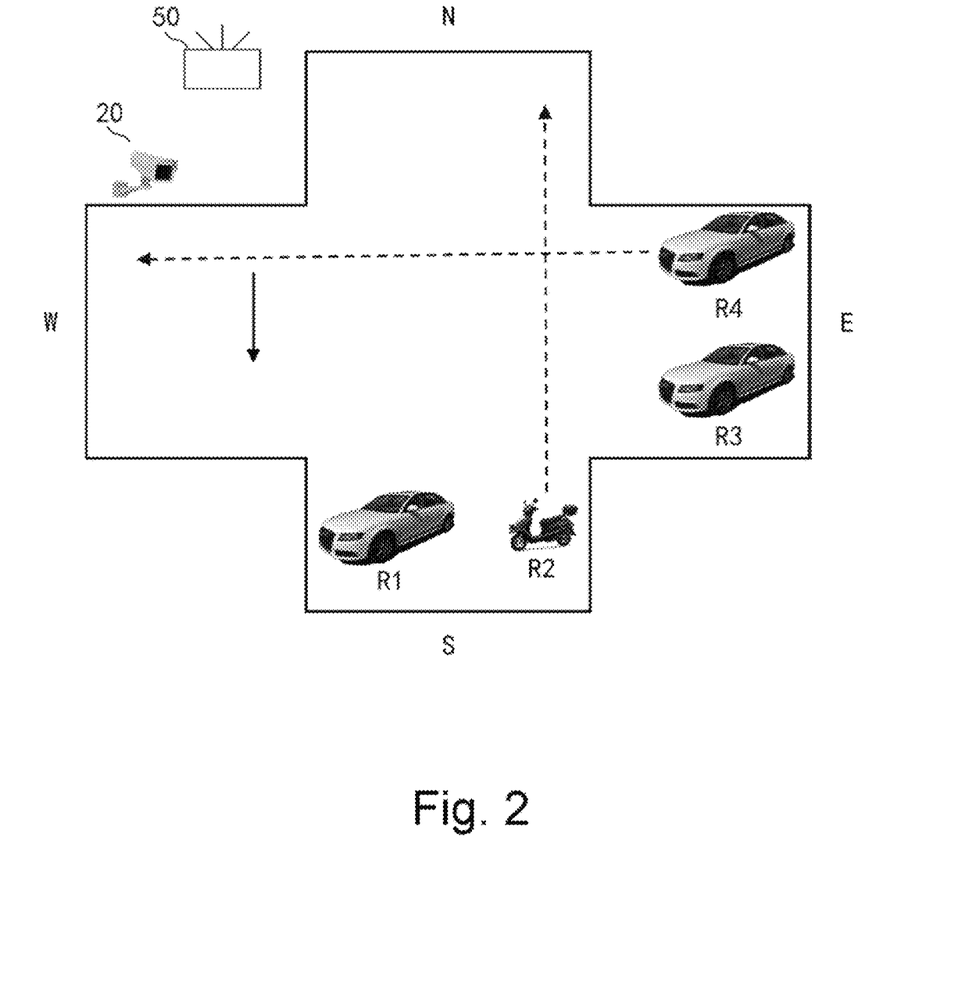
FIG. 2 shows a schematic diagram of a traffic scenario according to one embodiment.

FIG. 2 shows a schematic diagram of an intelligent traffic scenario as an application of the disclosure. As shown in the figure, multiple vehicles are travelling in two directions of the crossroads shown, e.g. a car R1 and an electric motorcycle R2 are travelling in a south-north direction (S→N), and cars R3, R4 are travelling in an east-west direction (E→W). In addition, a traffic monitoring camera 20 is also provided at the traffic junction, for the purpose of monitoring the traffic situation, e.g. photographing the overall traffic situation or capturing individual targets. In addition, a transceiver 50 is also provided at another position on the road and the junction; as a part of the first device 30, this is connected in a wired or wireless manner to another control device such as the central control device 40 (not shown in FIG. 2) in the first device 30. The transceiver 50 may be used to receive signals transmitted by various moving vehicles on the road, and transmit the received signals back to the central control device 40. In addition, the monitoring camera 20 is also connected to the central control device 40 in the first device 30 in a wired or wireless manner, for the purpose of gathering vehicle-related information and photographed road traffic situations to the central control device 40. The first device 30 is thus enabled to use the monitoring camera 20 to "view" the traffic states of moving targets such as moving vehicles or individuals, and at the same time use the transceiver 50 to "listen to" movement state reports of moving vehicles or individuals. It must be pointed out here that although the central control device 40 of the first device 30 is described in this example as being physically separated from the monitoring camera 20 and the transceiver 50, it is obvious that the central control device 40 could also be integrated with one or both of the transceiver and camera 20 to form a separate device as the target identification system 10; at the same time, the device formed in this way has the ability to receive state information relating to reference targets via different information sources. To facilitate description below, the case of separation continues to be used to expound the concept and solution of this embodiment of the disclosure.

According to an embodiment of the disclosure, moving targets such as cars, motorcycles or pedestrians travelling on a road all have wireless communication capability. For example, a car is fitted with an onboard unit OBU, and thus has the ability to send and receive signals, e.g. may communicate with the transceiver 50 using the SAE-J2735 standard. Other vehicles such as two-wheeled motorcycles may realize wireless communication by means of a communication module embedded when they left the factory, or may achieve the ability to communicate with the outside by means of a communication tool, such as a smart phone, of the driver thereof; pedestrians may likewise connect to a network via a smart phone. Thus, according to this embodiment, all moving vehicles or pedestrians on the road have the ability to connect to a network.

As shown in FIG. 2, the transceiver 50 may monitor vehicles' own state information issued by various reference vehicles travelling on the road; for example, the vehicles' own state information is basic safety message (BSM) complying with the SAE-J2735 standard. As shown in FIG. 2, the four vehicles R1-R4 shown issue messages BSM1-BSM4 respectively. Each BSM message contains movement information of the vehicle, e.g. one or more of travelling direction H, speed S, acceleration A, self-rotation angle and angular velocity, etc. It must be pointed out that in one example, the movement information of the vehicle may be vector information, e.g. parameters having a directional attribute for speed S and acceleration A, etc.; as a vector, this not only contains the size of the value of the speed or acceleration, but also contains speed or acceleration direction information, e.g. whether the speed or acceleration is toward the east or toward the west, etc. In another example, the movement information of the vehicle may only be scalar information, e.g. in the case of speed or acceleration, etc., may only contain the size of the value thereof. In addition, in the case of the cars R1, R3 and R4 fitted with OBUs, the BSM message sent may also contain identification information of the vehicle, e.g. registration number, temporary identification information, communication layer identification information, network layer identification information, etc., labelled as ID1, ID3 and ID4 below. The message sent by the motorcycle R2 might not contain a vehicle identifier, because of a failure to fit a registration plate, visual indistinctness or some other reason. The transceiver 50 sends the various BSM messages received to the central control device 40. It must be pointed out here that in the implementation of the disclosure, in the case of other moving targets, e.g. vulnerable traffic participants such as pedestrians and two- or three-wheeled vehicles in certain cities, these do not in themselves have a physical identifier similar to a registration plate; thus, the BSM messages issued by these moving targets likewise do not have a vehicle identifier, but as discussed below, may be uniquely characterized by movement parameters of these moving targets.

The camera 20 captures an image of a vehicle travelling on the road according to a preset condition, e.g. a set of consecutive stationary image frames PIC. The preset condition may be a predetermined time period, an emergency, a predetermined region, etc. In practice, if the vehicle has a registration plate fitted, the camera 20 may capture registration number information at the same time, but registration plate information might not be clearly visible in the photographed image if the vehicle speed is too high or for reasons relating to the precision of the camera 20. Another possibility is that the moving target itself has no registration plate fitted; this is especially true for example in the case where the moving target is a vulnerable traffic participant such as a pedestrian or a two- or three-wheeled vehicle. Thus, the camera 20 is unable to acquire vehicle identification information. According to one example, the camera 20 sends the captured vehicle image to the central control device 40 of the first device 30.

The central control device 40 receives from the camera 20 a set of image frames PIC or a video segment of the vehicle $R_C$ currently photographed, and receives, from the transceiver 50, messages such as BSM1-BSM4 sent by multiple vehicles and listened to at the same time. The central control device 40 generates a movement vector $MV_C$ corresponding to the current target $R_C$ on the basis of the image frames PIC; the movement vector $MV_C$ may include but is not limited to forward movement direction H, speed S, acceleration A, position P, etc. The central control device 40 then compares the movement vector $MV_C$ with movement vectors MV1-MV4 of various reference vehicles constructed on the basis of the messages BSM1-BSM4, to determine the pair with the best matched movement vectors, and thereby associates the movement vector $MV_C$ and the image or video PIC, and the best matched vector in MV1-MV4, with the same target.

Figure 3:
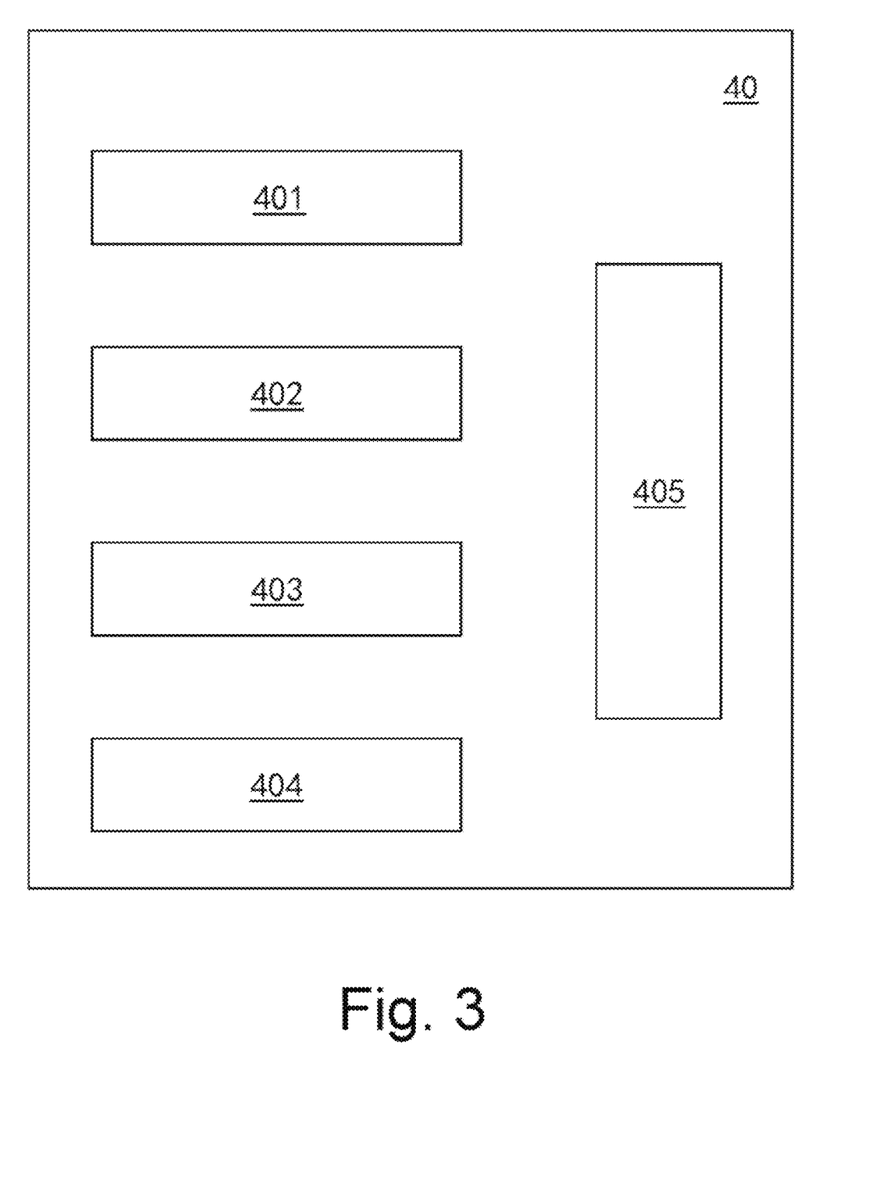
FIG. 3 shows a structural diagram of a central control device according to one embodiment.

FIG. 3 shows a configuration diagram of the central control device 40 according to one embodiment. As shown in the figure, the central control device 40 comprises a first interface unit 401, a second interface unit 402, a vector determining unit 403 and a matching degree computing unit 404. The first interface unit 401 communicates with the transceiver 50 via a wireless or wired communication link, and is used to receive vehicle state information, e.g. four messages BSM1-BSM4 from reference vehicles R1-R4 in this example. The second interface unit 402 communicates with the camera 20 via a wireless or wired communication link, and is used to receive an image PIC of a current moving vehicle that is photographed. Information received by the first interface unit 401 and second interface unit 402 may be temporarily cached in a memory 405.

The vector determining unit 403 uses each BSM message received from the first interface unit 401 to establish a movement vector MV, wherein each vector may contain multi-dimensional elements, e.g. including but not limited to speed S, forward movement direction H and acceleration A, i.e. MV={H, V, A}. Thus, in this example, the vector determining unit 403 may generate four movement vectors on the basis of the messages BSM1-BSM4 received by the first interface unit 401, e.g. MV1={H1,V1,A1}, MV2={H2,V2,A2}, MV3={H3,V3,A3}, MV4={H4,V4,A4}.

The vector determining unit 403 computes movement parameters of $R_C$ such as speed $V_C$, forward movement direction $H_C$ and acceleration $A_C$, etc. according to image frames or a video of the current vehicle $R_C$ photographed within a predetermined time t such as one second and received from the second interface unit 402, and then uses these movement parameters to establish a movement vector $MV_C$ of the vehicle $R_C$. As an example, when determining the movement parameters of $R_C$, the vector determining unit 403 may select two points on the vehicle in the image, e.g. two points on the head and tail of the vehicle, and then determine the orientation of a line connecting these two points in a local coordinate system, and can thereby obtain a bearing angle as the forward movement direction $H_C$. For the speed $V_C$, the vector determining unit 403 may determine a relative movement distance D of the vehicle in each pair of frames in a set of image frames photographed within a predetermined time t, e.g. the movement distance from a 1st frame to a final frame, and thereby compute the movement speed of the vehicle, i.e. $V_C=D/t$. The speed $V_C$ may also be the mean value of multiple speeds acquired on the basis of the relative distance $D_{i,i+1}$ between each pair of consecutive frames, i.e. $V_C=\text{Avg}(V_1+V_2 \ldots V_m)/m$, where $V_i=D_{i,i+1}/\Delta t$, wherein $\Delta t$ denotes the time interval between two frames, and $t=\Delta t*m$; m denotes the number of images in a set of image frames. The vector determining unit 403 may determine the acceleration $A_C$ on the basis of the previously computed speed. For example, $A_C=(V_{i+1}-V_i)/\Delta t$. Thus, the vector determining unit 403 establishes the movement vector $MV_C=(H_C, V_C, A_C)$ for the vehicle $R_C$ on the basis of a set of image frames received.

The matching degree computing unit 404 performs matching degree computation for the movement vector $MV_C$ of the current vehicle and the vectors MV1, MV2, MV3 and MV4 of the vehicles listened to. According to an embodiment of the disclosure, the matching degree computing unit 404 may determine the Euclidean distance Ed between the vector $MV_C$ and each of the vectors MV1, MV2, MV3 and MV4. For example, the distance Ed1 between the vectors $MV_C$ and MV1 may be expressed as:

$$Ed1=\sqrt{(H1-H_C)^2+(V1-V_C)^2+(A1-A_C)^2}$$

The distance Ed2 between the vectors $MV_C$ and MV2 may be expressed as:

$$Ed2=\sqrt{(H2-H_C)^2+(V2-V_C)^2+(A2-A_C)^2}$$

The distance Ed3 between the vectors $MV_C$ and MV3 may be expressed as:

$$Ed3=\sqrt{(H3-H_C)^2+(V3-V_C)^2+(A3-A_C)^2}$$

The distance Ed4 between the vectors $MV_C$ and MV4 may be expressed as:

$$Ed4=\sqrt{(H4-H_C)^2+(V4-V_C)^2+(A4-A_C)^2}$$

According to the result of the matching degree computation above, the matching degree computing unit 404 confirms the vehicle corresponding to the Ed having the smallest value in (Ed1, Ed2, Ed3, Ed4) as being the vehicle matched to the vehicle $R_C$ currently photographed by the camera 20, and associates the two with each other. It must be pointed out here that in the case where the BSM message contains a vehicle ID, movement information or image information of the vehicle $R_C$ may be associated with the vehicle ID directly, e.g. for the vehicle R3 having the smallest value Ed3, ID3 may be associated with the vehicle $R_C$ currently photographed by the camera 20. If the BSM message does not contain a vehicle ID, e.g. the matching degree computing unit 404 determines that Ed2 is the smallest value, then the movement vector MV2 may be used to identify the current vehicle $R_C$, and the movement vector or image of $R_C$ may be associated with MV2.

Although, in the above embodiment, a specific method is given in which the best degree of matching is determined by using Euclidean distance to compute vector distance, the disclosure is not limited to this method; for example, in the Euclidean distance embodiment above, a different weight may also be allocated for each key element, e.g. a higher weight may be allocated to speed, and a lower weight may be allocated to other key elements, e.g.:

$$Ed=\sqrt{w1(V-V_C)^2+w2(A-A_C)^2+w3(H-H_C)^2}$$

wherein w1>w2>w3.

In addition, although, in the above example, speed, direction and acceleration are taken to be key elements of the movement vector for the purposes of description, the disclosure is obviously not limited to this; a greater or smaller number of key elements may also be used to form the movement vector, e.g. a position key element P may be further added in the movement vector MV. Since the camera 20 is arranged at a fixed position, position information of the current vehicle photographed thereby can also be determined; thus, position information such as latitude and longitude of the current vehicle may be embedded in the image frame, to notify the central control device 40 of the position of the current vehicle. The BSM message may contain vehicle position information provided by a GPS receiver in the vehicle. The vector determining unit 403 may selectively use these items of movement information to construct respective movement vectors.

In addition, although, in this embodiment, the best degree of matching is determined by computing vector distance between movement vectors, the disclosure is not limited to this; other methods may also be used. For example, in another example, the best degree of matching may be determined by computing a correlation between movement vectors; the current target and reference target corresponding to the two movement vectors with the highest correlation are labelled as associated targets, wherein the reference target is the matched reference target of the current target.

Although, in the above embodiment, the central control device 40 is shown as being realized by multiple units, the disclosure is obviously not limited to this; for example, various units of the central control device 40 may also be realized by a processor, which realizes the functions of the various units and other control functions by executing instructions stored in the memory 405 for example.

In addition, in the above embodiment, the camera 20 is shown as sending the photographed image PIC to the central control device 40, the central control device 40 then generating movement information on the basis of the image PIC and establishing a movement vector of the vehicle RC. However, in another embodiment, an algorithm for generating movement parameters may also be integrated in the camera 20, such that the camera 20 can send movement information such as speed generated therein to the central control device 40 directly; thus, the volume of data transmitted and the computation costs of the central control device 40 can be reduced. In addition, although, in the above embodiment, cars and motorcycles are taken as examples for the purpose of illustration, the moving targets of the disclosure are not limited to this, but may include all objects capable of moving, e.g. pedestrians, bicycles, etc.

Figure 4:
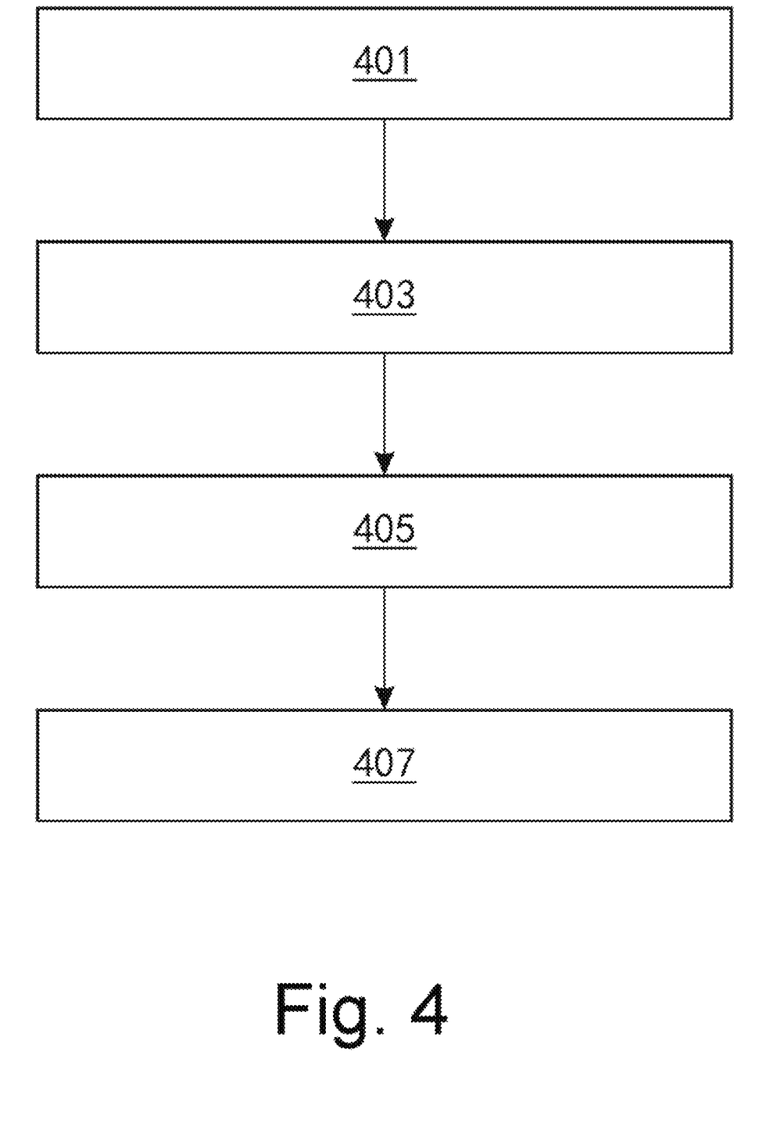
FIG. 4 shows a schematic flow chart of a target identification method according to an embodiment of the disclosure.

Although the target identification system 10 of the disclosure is explained above in conjunction with a vehicle traffic management scenario, the disclosure is not limited to this, but may be broadly used for identifying various types of information associated with the same target from multiple channels of information sources, so as to realize identification of the target. FIG. 4 shows a target identification method according to an embodiment of the disclosure.

As shown in FIG. 4, in step 401, a first device 30 receives target detection information from a second device 20; the target detection information may be obtained by direct detection of any target by the second device, but may also be obtained through another channel. As stated above, the target detection information may be at least a portion of state information of the target, e.g. speed, but may also be image information of the target, e.g. a set of stationary image frames or a dynamic video, etc.

In step 403, the first device 30 receives state information relating to multiple reference targets R1-RN, e.g. BSM messages; these items of state information may be sent to the first device 30 by the reference targets by broadcast communication or point-to-point communication already established with the target identification system 10, but may also be sent to the first device 30 by another information source.

In step 405, after receiving the target detection information from the second device 20 and the state messages BSM of the reference targets, the first device 30 matches the target detection information to the state information BSM1-BSMm of multiple reference targets, i.e. determines a degree of matching between the target detection information and the target state information of each reference target. In step 407, the first device 30 identifies the reference target having the highest degree of matching in the matching results for the various reference targets determined in step 405, and thereby associates the target currently detected by the second device 20 with the reference target having the highest degree of matching. For example, when the first device 30 determines that the target detection information of the second device 20 is best matched to the state information of the reference target R3 listened to, the current target detected by the second device 20 is associated with the target R3, for the purpose of subsequent processing.

Figure 5:
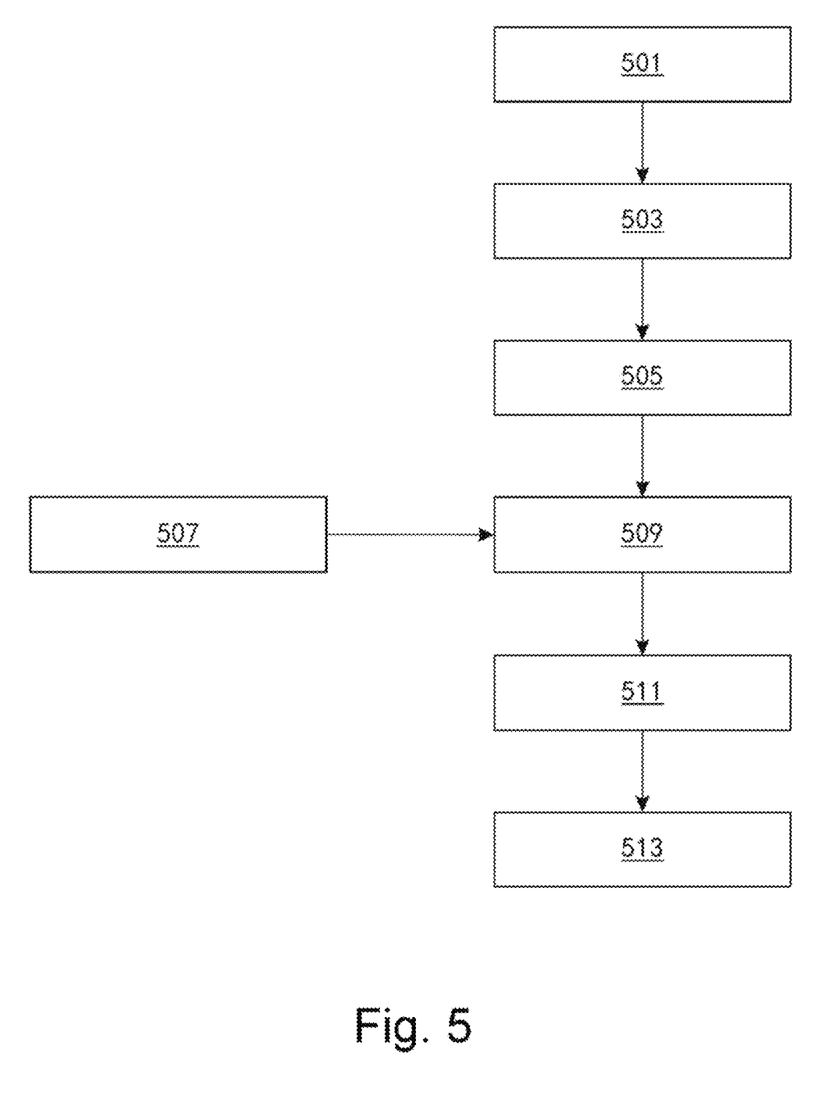
FIG. 5 shows a schematic flow chart of a target identification method according to another embodiment.

FIG. 5 shows a flow chart of the target identification method realized by the target identification system 10 of the disclosure in a traffic scenario. In step 501, the target identification system 10 uses the traffic monitoring camera 20 to monitor the traffic situation, and acquires a set of image frames PIC of a current target $R_C$ photographed within a preset time t and located within a monitoring range. In step 503, the target identification system 10 uses the set of image frames PIC to compute movement parameters characterizing $R_C$, e.g. speed $V_C$, forward movement direction $H_C$, acceleration $A_C$ and position $P_C$, etc.

In step 505, the target identification system 10 uses at least a portion of these movement parameters computed on the basis of the image frames PIC to establish a movement vector $MV_C$ of the vehicle $R_C$, e.g. $MV_C=(H_C, V_C, A_C, P_C)$. In step 507, the target identification system 10 uses the transceiver 50 to listen to vehicles' own state information issued by various reference vehicles passing on the road, e.g. messages BSM complying with the SAE-J2735 standard, and uses movement information contained in the BSM message of each vehicle to establish movement vectors of the various vehicles listened to, e.g. establishes corresponding movement vectors MV1-MV4 for the four vehicles R1, R2, R3 and R4 shown in FIG. 2, e.g. MV1={H1,V1,A1, P1}, MV2={H2,V2,A2, P2}, MV3={H3,V3,A3, P3}, MV4={H4,V4,A4, P4}.

In step 509, the target identification system 10 performs matching degree computation for the movement vector $MV_C$ of the current vehicle and each of MV1, MV2, MV3 and MV4 of the vehicles listened to; for example, the degree of matching may be characterized by computing the Euclidean distance Ed between the vector $MV_C$ and each of the vectors MV1, MV2, MV3 and MV4, wherein a smaller distance Ed indicates a higher degree of matching. In step 511, the target identification system 10 identifies the vehicle having the highest degree of matching amongst the reference vehicles R1, R2, R3 and R4, for example R3, as being the current vehicle $R_C$ photographed by the camera 20, and associates the two with each other. Thus, in the following step 513, the choice may be made to use the movement vector $MV_C$ of the vehicle $R_C$ to correct the movement vector MV3 of the vehicle R3 for example, or the movement vector MV3 of the vehicle R3 to correct the movement vector $MV_C$ of the vehicle $R_C$ photographed by the camera; it is even possible to produce a comprehensive movement vector on the basis of the movement vector $MV_C$ of the vehicle $R_C$ and the movement vector MV3 of the vehicle R3, to obtain more precise state information for the current vehicle $R_C$. Optionally, in step 513, the state observed by the camera 20 may also be reported to the identified vehicle R3.

Application

Precise Information Detection

Once the correspondence between the current vehicle $R_C$ photographed by the camera 20 and the vehicle listened to by the transceiver 50 has been identified, the central control device 40 may use the movement information of the vehicle $R_C$ to correct the movement information, e.g. speed V3, direction H3, position P3, etc. of the same vehicle identified, for example R3, so as to depict the current state of the vehicle R3 more accurately.

Traffic State Broadcasting

In one embodiment, when the second device 20 acquires a state relating to a current target, a state report signal indicating the state relating to the current target may be sent to the first device 30, in the form of a broadcast for example. For example, when the camera 20 captures a situation in which the vehicle Rc is in traffic danger or might violate traffic law, then due to the fact that the camera 20 is unable to communicate with the vehicle $R_C$, the camera 20 attaches alert information for the first device 30 while photographing the vehicle $R_C$ or thereafter. As stated above, after using the image uploaded by the camera 20 and the state message BSM received from the transceiver 50 to identify the current target photographed by the camera 20, e.g. the vehicle R3, the first device 30 can send a notification signal that the vehicle is in traffic danger or might violate traffic law to the vehicle R3 via the transceiver 50, e.g. send it by unicast by point-to-point communication, or broadcast an alert message containing an identifier ID3 of the vehicle R3, so that only the vehicle R3 having the identifier ID3 will decode the broadcast message. In one example, the first device 30 may extract the identifier ID3 of the vehicle R3 from a target state message sent by the vehicle R3 and store the identifier, but in another example, the first device 30 may also acquire the identifier ID3 of the vehicle R3 through another channel, e.g. in other information sent by the vehicle R3. In addition, in the disclosure, the state report signal indicating the state relating to the current vehicle that is acquired by the first device 30 is not limited to being from the second device 20, but may also be from any other device and sent in the form of a broadcast, etc., and the broadcast state report signal may contain a target identifier of the current target.

In another embodiment, if the central control device 40 identifies the current target photographed by the camera 20 as being the vehicle R2 using the image uploaded by the camera 20 and the state message BSM received from the transceiver 50, the BSM message uploaded by the vehicle R2 at this time also does not contain any vehicle identifier; thus, for this situation, as stated above, the vector MV2 may be used to identify the motorcycle R2. In order to send a notification signal to the motorcycle R2 indicating a traffic state thereof, e.g. speeding or in danger, the central control device 40 first uses forward movement direction information $H_C$ in $MV_C$ to correct forward movement direction information H2 contained in the message BSM2 received from R2, and then, based on amended forward movement direction information H2' of the vehicle R2, uses beamforming technology to generate a beam signal corresponding to the forward movement direction H2', and then sends out the beam signal as an alert notification signal by means of a broadcast channel of the transceiver 50 for example. The broadcast signal that is sent has undergone processing by beamforming technology, comprises beam information and forms a beam pointing in the forward movement direction of the matching vehicle R2; thus, R2 in this forward movement direction will receive the alert message.

It must be pointed out here that although embodiments of the disclosure have been described in conjunction with the above, the disclosure is not limited to this. For example, the target identification system here may comprise processors, electronic devices, hardware devices, electronic components, logic circuits, memories, software code and firmware code, etc. or any combination of these. Technicians will also recognize that the various illustrative units and method steps described in conjunction with the content disclosed herein may be realized as electronic hardware, computer software or a combination of both.

In addition, a machine-readable medium provided in another embodiment of the disclosure has a machine-readable instruction stored thereon which, when executed by a computer, causes the computer to execute any one of the above methods disclosed herein. Specifically, a system or apparatus equipped with a machine-readable medium may be provided; software program code for realizing the function of any one of the above embodiments is stored on the machine-readable medium, and a computer of the system is caused to read and execute the machine-readable instruction stored in the machine-readable medium. In this case, the program code read from the machine-readable medium is itself able to realize the function of any one of the above embodiments; thus, the machine-readable code and the machine-readable medium storing the machine-readable code form part of the disclosure.

It must be explained that not all of the steps in the various processes above are necessary; certain steps may be omitted according to actual needs. The order in which the various steps are performed is not fixed; for example, step 507 may be performed before step 501. The system structure described in the various embodiments above may be a physical structure, but may also be logic structure, i.e. some modules might be realized by the same physical entity, or some modules might be realized by multiple physical entities, or may be realized jointly by certain components in multiple independent devices.

The disclosure has been shown and explained in detail above by means of the drawings and preferred embodiments, but the disclosure is not limited to these disclosed embodiments; based on the multiple embodiments above, those skilled in the art will know that code review measures in different embodiments above may be combined to obtain more embodiments of the disclosure, and these embodiments also fall within the scope of protection of the disclosure.

What is claimed is:

1. A method for target identification implemented by a first device, comprising:
    generating target detection information of a current target using a second device, the current target being in motion and the second device having a fixed position, the target detection information including a set of chronologically consecutive image frames of the current target;
    receiving target state information from a plurality of reference targets with a transceiver having a fixed position;
    transmitting the generated target detection information and the received target state information from the transceiver to the first device;
    generating a first movement vector of the current target based on the transmitted set of image frames using the first device;
    generating a second movement vector for each reference target of the plurality of reference targets based on the transmitted target state information of each reference target using the first device;
    identifying the current target as one of the reference targets of the plurality of reference targets, the one of the reference targets identified as having a best degree of matching of the first movement vector and the corresponding second movement vector; and
    amending the corresponding second movement vector based on the first movement vector using the first device to determine an amended forward movement direction of the current target.

2. The method according to claim 1, wherein:
    identifying determining the best degree of matching comprises computing a vector distance between the first movement vector and each of the second movement vectors, and
    identifying the current target as the reference target of the plurality of reference targets having the corresponding smallest vector distance.

3. The method according to claim 1, wherein the first movement vector includes at least one of an unamended forward movement direction, speed, acceleration, target position, self-rotation angle, and angular velocity of the current target.

4. The method according to claim 3, wherein:
    the target state information of the reference target identified as the current target includes a target identifier.

5. The method according to claim 4, further comprising:
    sending a notification signal to the current target based on the target identifier,
    wherein the notification signal indicates that the current target is in traffic danger.

6. The method according to claim 5, further comprising:
    sending the notification signal via a broadcast channel,
    wherein the notification signal comprises the target identifier.

7. The method according to claim 3, further comprising:
    generating a beam signal using beamforming technology; and
    transmitting the beam signal to the current target by pointing the beam signal is in the amended forward movement direction,
    wherein the beam signal includes beam information including a notification signal.

8. The method according to claim 7, further comprising:
    transmitting the beam signal via a broadcast channel in response to received state information relating to the current target.

9. The method according to claim 1, further comprising:
    identifying the current target using the first device,
    wherein the second device lacks an ability to identify the current target.

10. The method according to claim 9, wherein:
    the second device is a traffic monitoring camera fixedly located at a traffic junction.

11. The method according to claim 1, wherein:
    the target state information of at least one reference target of the plurality of reference targets is generated by a smart phone on board the at least one reference target, and
    the smart phone transmits the target state information to the transceiver.

12. The method according to claim 11, wherein the target state information is generated by the smart phone and includes a traveling direction, a speed, an acceleration, and an angular velocity of the reference target associated with the smart phone.

13. The method according to claim 1, wherein the target state information is transmitted directly from the plurality of reference targets to the transceiver.

14. A target identification system, comprising:
a first device including a central control device;
a transceiver operably connected to the first device and having a fixed position, the transceiver configured to receive target state information of each reference target of a plurality of reference targets; and
a second device operably connected to the transceiver and having a fixed position, the second device configured to generate target detection information of a current target, the current target being in motion, and the target detection information including a set of chronologically consecutive image frames of the current target,
wherein the transceiver is configured to transmit the target state information and the target detection information to the first device,
wherein the central control device is configured to (i) generate a first movement vector of the current target based on the set of image frames, (ii) generate a second movement vector for each reference target of the plurality of reference targets based on the target state information of each reference target, (iii) identify the current target as one of the reference targets of the plurality of reference targets, and (iv) amend the corresponding second movement vector based on the first movement vector to determine an amended forward movement direction of the current target,
wherein the one of the reference targets is identified as having a best degree of matching of the first movement vector and the corresponding second movement vector.

15. The target identification system according to claim 14, wherein the central control device includes:
a first interface unit configured to receive the target state information;
a second interface unit configured to receive the first movement vector;
a vector determining unit configured, based on the target state information of each reference target of the plurality of reference targets, to generate the second movement vectors; and
a matching degree computing unit configured to determine the best degree of matching.

16. The target identification system according to claim 15, wherein the matching degree computing unit is further configured (i) to compute a vector distance between the first movement vector and each of the second movement vectors, and (ii) to identify the current target as the reference target of the plurality of reference targets having the corresponding smallest vector distance.

17. The target identification system according to claim 15, wherein the first movement vector includes at least one of an unamended forward movement direction, speed, acceleration, target position, self-rotation angle, and angular velocity of the current target.

18. The target identification system according to claim 17, wherein the central control device is further configured:
to generate a beam signal using beamforming technology; and
to transmit, the beam signal to the transceiver,
wherein the transceiver is configured to transmit the beam signal to the current target by pointing the beam signal in the amended forward movement direction,
wherein the beam signal is sent via a broadcast channel from the transceiver to the current target, and
wherein the beam signal includes beam information including a notification signal.

19. The target identification system according to claim 17, wherein the target state information of the reference target identified as the current target is associated with a target identifier of the reference target identified as the current target.

20. The target identification system according to claim 19, wherein the central control device is further configured, based on target state information that relates to the current target, to determine whether to send a notification signal to the reference target having the target identifier.

* * * * *

UNITED STATES PATENT AND TRADEMARK OFFICE
CERTIFICATE OF CORRECTION

PATENT NO. : 11,616,969 B2
APPLICATION NO. : 16/953698
DATED : March 28, 2023
INVENTOR(S) : Liang It is certified that error appears in the above-identified patent and that said Letters Patent is hereby corrected as shown below:

In the Claims

In Claim 2, at Column 12, Line 16: "identifying determining the best degree" should read --identifying the best degree--.

In Claim 7, at Column 12, Line 44: "pointing the beam signal is in the" should read --pointing the beam signal in the--.

In Claim 18, at Column 14, Line 23: "to transmit, the beam signal" should read --to transmit the beam signal--.

Signed and Sealed this
Twentieth Day of June, 2023

Katherine Kelly Vidal
*Director of the United States Patent and Trademark Office*